(12) United States Patent
Chang

(10) Patent No.: US 6,643,897 B2
(45) Date of Patent: Nov. 11, 2003

(54) RETRACTABLE GRAB HANDLE AND COAT HOOK

(75) Inventor: Henry Chang, Sterling Heights, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/001,168

(22) Filed: Oct. 23, 2001

(65) Prior Publication Data
US 2003/0074767 A1 Apr. 24, 2003

(51) Int. Cl.[7] ................................................. E05D 7/04
(52) U.S. Cl. .............................. 16/248; 16/426; 16/438; 16/444
(58) Field of Search ........................ 16/428, 426, 440, 16/438, 445, 444; 296/214, 97.9, 39.1; 224/313

(56) References Cited

U.S. PATENT DOCUMENTS

| | | | |
|---|---|---|---|
| 4,221,354 A | | 9/1980 | Kempkers |
| 4,686,609 A | * | 8/1987 | Dykstra et al. ............. 362/490 |
| 4,720,028 A | | 1/1988 | Takemura et al. |
| 4,981,323 A | * | 1/1991 | Dowd et al. ................. 296/214 |
| 5,366,127 A | | 11/1994 | Heinz |
| 5,419,067 A | | 5/1995 | Drummond et al. |
| D379,170 S | * | 5/1997 | Moore et al. ............... D12/190 |
| 5,625,921 A | | 5/1997 | Smith |
| 5,820,205 A | * | 10/1998 | Ammons ...................... 296/214 |
| D403,998 S | * | 1/1999 | Hutzel et al. .............. D12/190 |
| 5,855,408 A | * | 1/1999 | Rickabus ..................... 296/214 |
| 6,076,233 A | * | 6/2000 | Sasaki et al. ................. 16/444 |
| 6,095,469 A | * | 8/2000 | Von Alman .................. 248/304 |
| 6,397,435 B1 | * | 6/2002 | Gosselet ...................... 16/438 |
| 6,422,524 B1 | * | 7/2002 | Spagnuolo et al. ......... 248/307 |
| 6,447,055 B1 | * | 9/2002 | Mainville et al. ........... 296/214 |
| 6,467,130 B2 | * | 10/2002 | Kurachi et al. ............... 16/438 |

FOREIGN PATENT DOCUMENTS

| | | |
|---|---|---|
| DE | 3513293 A1 | 10/1986 |
| DE | 20101541 U1 | 5/2001 |
| EP | 1046542 A1 | 4/2000 |

\* cited by examiner

*Primary Examiner*—Gary Estremsky
*Assistant Examiner*—Mark Williams
(74) *Attorney, Agent, or Firm*—Tarolli, Sundheim, Covell & Tummino L.L.P.

(57) ABSTRACT

An apparatus (10) for connection with a vehicle portion (8) comprises a grab handle (40) and a grab handle hinge (60). The grab handle hinge (60) supports the grab handle (40) for pivotal movement relative to the vehicle portion (8) between a grab handle stored position adjacent the vehicle portion (8) and a grab handle operative position spaced apart from the vehicle portion (8). A cap (70) blocks visibility of part of the grab handle hinge (60) from the vehicle occupant compartment when the grab handle (40) is in the grab handle stored position. A cap hinge (90) supports the cap (70) for pivotal movement between a cap stored position covering the part of the grab handle hinge (60) and a cap operative position spaced apart from the vehicle portion (8) and from the grab handle hinge (60). The cap (70) has a portion (74) adapted to support a garment when the cap (70) is in the cap operative position.

13 Claims, 3 Drawing Sheets

RETRACTABLE GRAB HANDLE AND COAT HOOK

TECHNICAL FIELD

The present invention relates to a vehicle grab handle and coat hook assembly.

BACKGROUND OF THE INVENTION

A conventional grab handle used in automobiles is pivotally attached to the vehicle on the vehicle roof rail. A hinge supports the grab handle for pivotal movement between a stored position adjacent the vehicle roof rail and an operative position pivoted downward and spaced apart from the vehicle roof rail. The grab handle is typically spring biased so that it normally stays in the stored position. When the grab handle is pivoted downward to the operative position, it can be grasped by a vehicle occupant to help support or steady the vehicle occupant.

Some automobiles also have one or more coat hooks for hanging a garment. The coat hook is typically permanently affixed to the vehicle roof rail, sometimes near or together with the grab handle. The coat hook may also be of a type that pivots downward from a stored position into an operative position.

SUMMARY OF THE INVENTION

The present invention relates to an apparatus for connection with a vehicle portion adjacent a vehicle occupant compartment. The apparatus comprises a grab handle and a grab handle hinge. The grab handle hinge supports the grab handle for pivotal movement relative to the vehicle portion between a grab handle stored position adjacent the vehicle portion and a grab handle operative position spaced apart from the vehicle portion. A cap blocks visibility of part of the grab handle hinge from the vehicle occupant compartment when the grab handle is in the grab handle stored position. A cap hinge supports the cap for pivotal movement between a cap stored position covering the part of the grab handle hinge and a cap operative position spaced apart from the vehicle portion and from the part of the grab handle hinge. The cap has a portion adapted to support a garment when the cap is in the cap operative position.

BRIEF DESCRIPTION OF THE DRAWINGS

The foregoing and other features of the invention will become more apparent to one skilled in the art upon consideration of the following description of the invention and the accompanying drawings, in which.

DESCRIPTION OF ONE EMBODIMENT OF THE INVENTION

Figure 1:
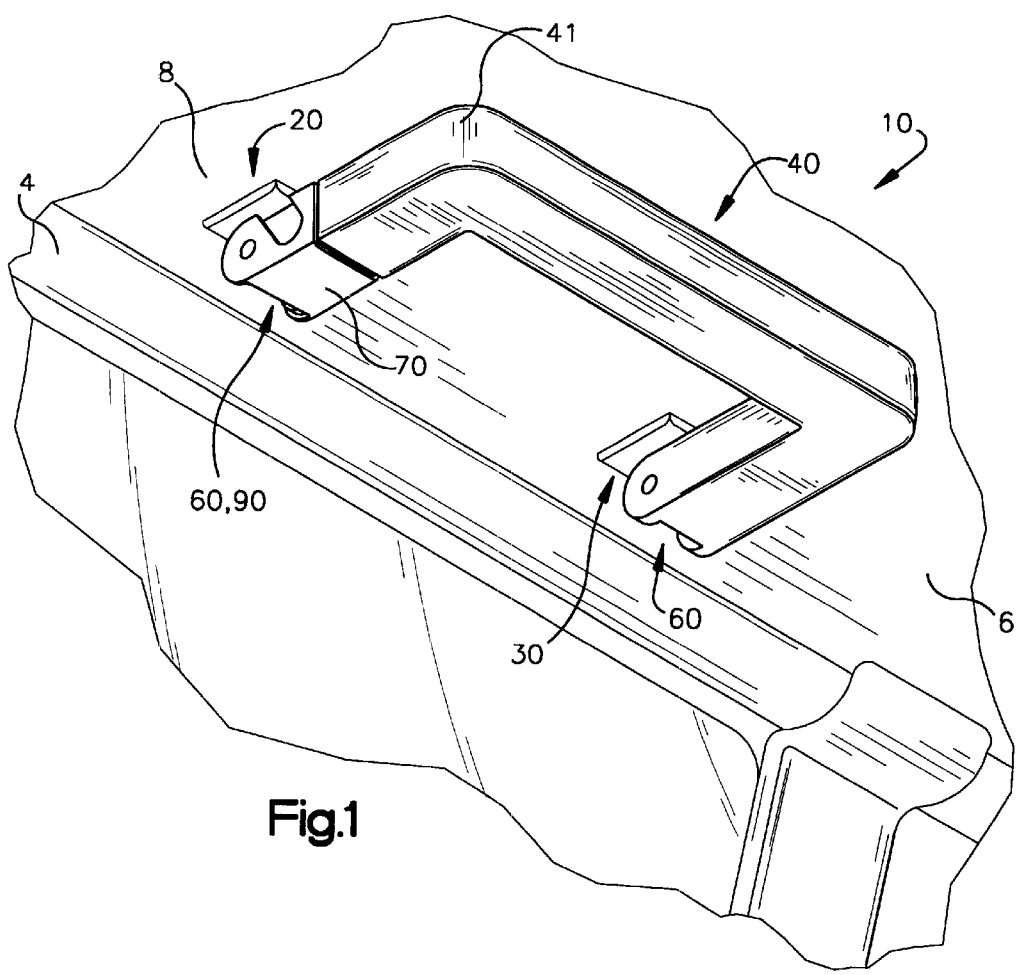
FIG. 1 is a schematic perspective view of an apparatus constructed in accordance with the present invention.
Figure 2:
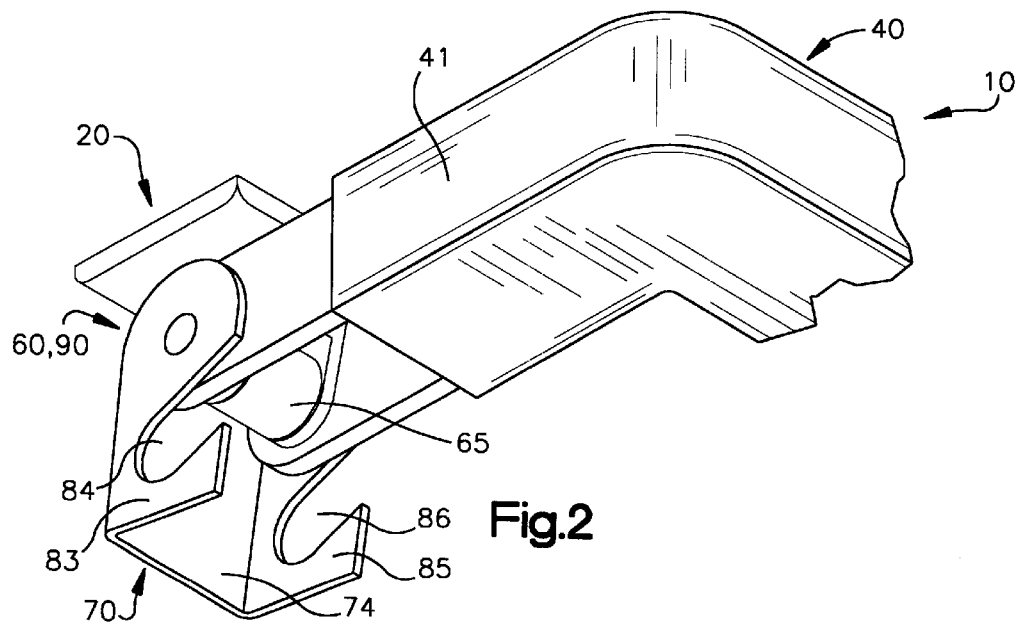
FIG. 2 is an enlarged perspective view of a portion of the apparatus of FIG. 1 in a different position.
Figure 3:
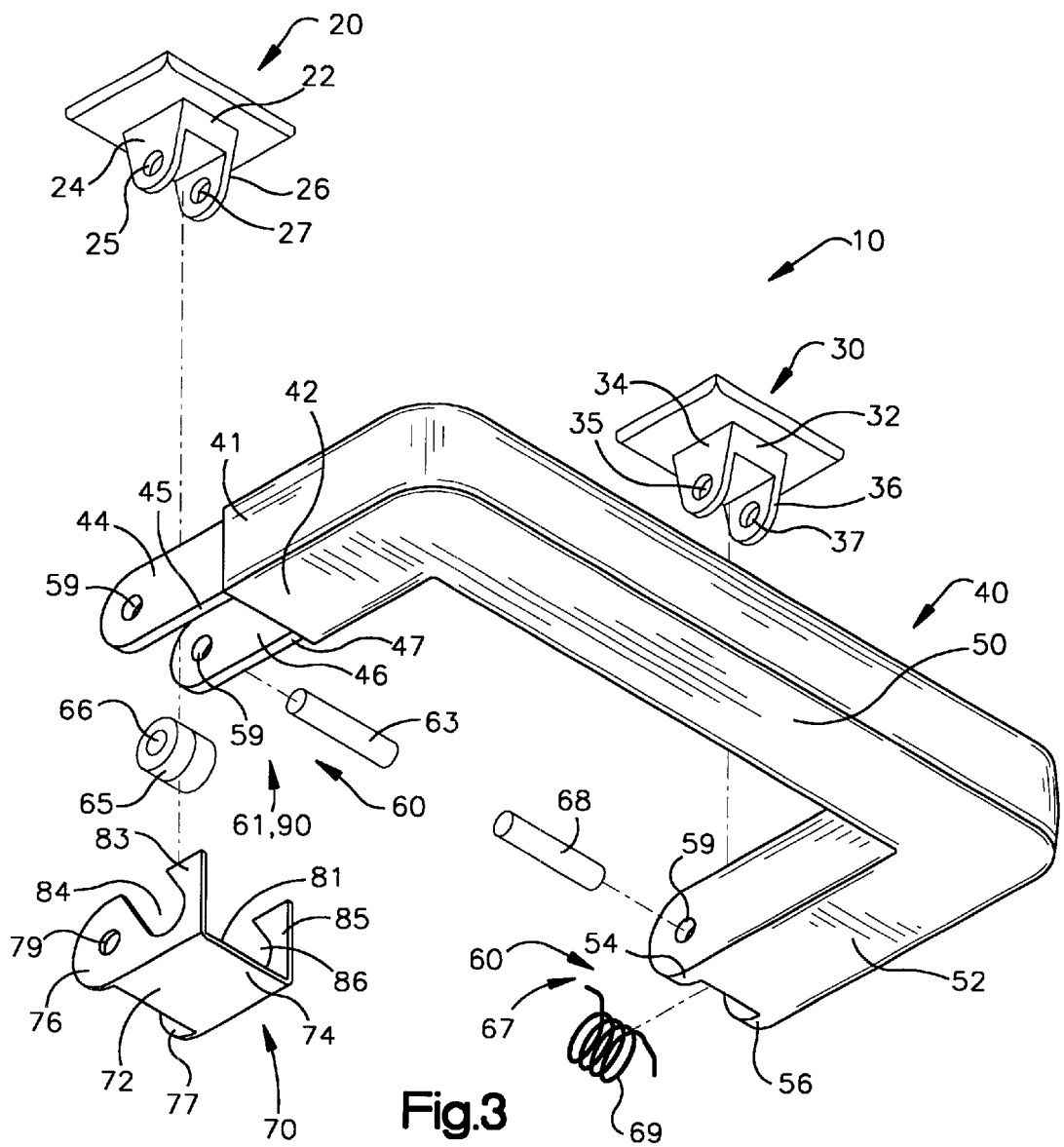
FIG. 3 is an exploded perspective view of parts of the apparatus of FIG. 1.
Figure 4:
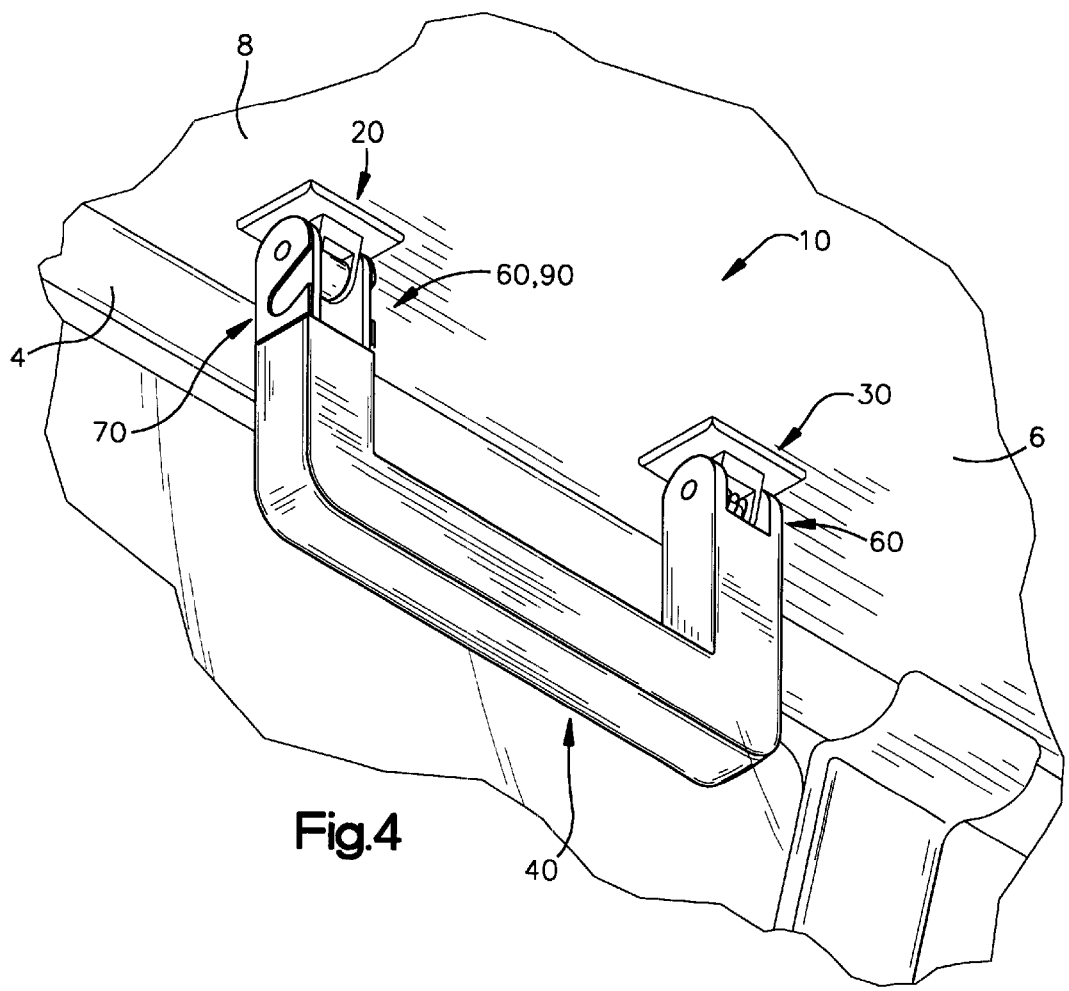
FIG. 4 is a schematic perspective view of the apparatus of FIG. 1 in a different position.

The present invention, as illustrated in the embodiment in FIGS. 1–4, relates to a vehicle grab handle and coat hook apparatus. The invention is applicable to various grab handle and coat hook assemblies. As representative of the invention, FIG. 1 illustrates a portion 8 of a vehicle including the grab handle and coat hook apparatus 10.

The vehicle portion 8 is a portion of a roof area panel 6 adjacent a roof rail 4 of the vehicle. The vehicle portion 8 is adjacent a vehicle occupant compartment of the vehicle. As a result, the apparatus 10 is engageable from, and useful in, the vehicle occupant compartment.

The apparatus 10 includes a first base member or first bracket 20, and a second base member or second bracket 30. The apparatus 10 also includes a grab handle 40, a grab handle hinge assembly 60, a cap 70, and a cap hinge assembly 90.

The first bracket 20 is secured to the vehicle portion 8 in a known manner (not shown). The first bracket 20 includes a first base portion 22 and two extension arms 24, 26 projecting from the first base portion 22. Each one of the extension arms 24, 26 has a respective engagement hole 25, 27 for receiving a part of the grab handle hinge assembly 60.

The second bracket 30 is secured to the vehicle portion 8 in a known manner (not shown). The second bracket 30 includes a second base portion 32 and two extension arms 34, 36 projecting from the second base portion. Each one of the extension arms 34, 36 has a respective engagement hole 35, 37 for receiving a part of the grab handle hinge assembly 60.

The grab handle 40 has a U-shaped configuration including a first connection portion 42, a second connection portion 52, and a gripping portion 50 interconnecting the first and second connection portions. The first connection portion 42 has two support arms 44, 46 for attachment to the grab handle hinge assembly 60. The second connection portion 52 has two support arms 54, 56 for attachment to the grab handle hinge assembly 60. Each one of the four support arms 44, 46, 54, 56 has an aperture 59 (FIG. 3, three shown) for engaging the grab handle hinge assembly 60. The grab handle 40 may be partially coated with a polymer 41 or other suitable material for facilitating grasping of the grab handle.

A first part 61 of the grab handle hinge assembly 60 supports the grab handle 40 on the first bracket 20 for pivotal movement relative to the vehicle portion 8 between a grab handle stored position (FIG. 1) adjacent the vehicle portion and a grab handle operative position (FIG. 4) pivotally spaced apart from the vehicle portion. The first part 61 of the grab handle hinge assembly 60 includes a first pin 63 and a damper member 65 disposed between the extension arms 24, 26 of the first bracket 20.

The first pin 63 is disposed within the engagement holes 25, 27 of the first bracket 20, the apertures 59 of the first connection portion 42, and a through bore 66 of the damper member 65. The first pin 63 thereby acts as an axle about which the first connection portion 42 of the grab handle 40 may pivot relative to the first bracket 20 and the vehicle portion 8. The damper member 65 slows the pivoting movement of the grab handle 40 as it moves between the grab handle stored position and the grab handle operative position, in a manner known in the art.

The cap 70, or hook member, blocks visibility of the first part 61 of the grab handle hinge assembly 60 from the vehicle occupant compartment when the grab handle 40 is in the grab handle stored position (FIG. 1). The cap 70 has a cap stored position (FIG. 1) engaging the support arms 44, 46 of the first connection portion 42 of the grab handle 40. The cap 70 also has a cap operative position (FIG. 2) when pivoted away from the support arms 44, 46 of the grab handle 40. The first part 61 of the grab handle hinge assembly 60 also forms a cap hinge assembly 90 that allows the cap 70 to move between the cap stored position and the cap operative position.

The cap 70 has a first part 72 for pivotal attachment to the grab handle hinge assembly 60 and a second part 74 for supporting a garment hanger and/or a garment (i.e., a coat hook). The first part 72 of the cap 70 has two side portions 76, 77, each with holes 79 (FIG. 3, one shown) for receiving the first pin 63. The cap 70 is thereby supported for pivotal movement about the first pin 63, relative to the grab handle 40, and/or relative to the first bracket 20.

The second part 74 of the cap 70 has a cap portion 81 interposed between two hook arms 83, 85. Each hook arm 83, 85 has a slot 84, 86 (FIG. 3) for receiving part of a garment hanger and/or garment. When the cap 70 is in the cap stored position, the cap portion 81 engages edges 45, 47 of the support arms 44, 46 of the first connection portion 42 of the grab handle 40.

A second part 67 of the grab handle hinge assembly 60 supports the grab handle 40 on the second bracket 30 for pivotal movement relative to the vehicle portion 8 between the grab handle stored position (FIG. 1) adjacent the vehicle portion and the grab handle operative position (FIG. 4) pivotally spaced apart from the vehicle portion. The second part 67 of the grab handle hinge assembly 60 includes a second pin 68 and a biasing member 69, such as a coil spring. The second pin 68 is disposed within the engagement holes 35, 37 of the second bracket 30, the apertures 59 of the second connection portion 52, and an interior of the biasing member 69. The second pin 68 thereby acts as an axle about which the second connection portion 52 may pivot, simultaneously with the first connection member 42, relative to the second bracket 30 and the vehicle portion 8. The biasing member 69 pivotally biases the grab handle 40 toward the grab handle stored position (typically when the grab handle is released from the grab handle operative position by the vehicle occupant).

When the grab handle 40 moves from the grab handle stored position (FIG. 1) to the grab handle operative position (FIG. 4), the edges 45, 47 of the first connection portion 42 of the grab handle 40 engage the cap portion 81 of the cap 70 and pivot the cap along with the grab handle 40 about the first pin 63. Thus, the cap 70 may be moved to the cap operative position by moving the grab handle 40.

Additionally, the second part 74 of the cap may be grasped by the vehicle occupant and pivoted, independently of the grab handle, downward about the first pin 63, to the cap operative position (FIG. 2), with the grab handle remaining in the grab handle stored position. The cap operative position of the cap 70 thereby allows the second part 74 of the cap to be used to support a garment hanger and/or garment.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for connection with a vehicle portion adjacent a vehicle occupant compartment, said apparatus comprising:

a grab handle;

a grab handle hinge supporting said grab handle on the vehicle portion for pivotal movement relative to the vehicle portion between a stored position adjacent the vehicle portion and an operative position spaced apart from the vehicle portion;

a cap including a cap portion for blocking visibility of part of said grab handle hinge from the vehicle occupant compartment when said grab handle is in the stored position; and a cap hinge supporting said cap for pivotal movement between a cap stored position covering the grab handle hinge and a cap operative position spaced apart from the vehicle portion and from said part of said grab handle hinge, said cap further including spaced first and second hook portions extending transverse to said cap portion from opposite lateral edges of said cap portion, said first and second hook portions being adapted to support a garment when said cap is in said cap operative position.

2. The apparatus as set forth in claim 1 wherein said grab handle has a portion that engages said cap when said grab handle is moved from said grab handle stored position to said grab handle operative position, said portion causing said cap to be pivoted along with said grab handle from said grab handle stored position to said grab handle operative position.

3. The apparatus as set forth in claim 1 further including a biasing member for biasing said grab handle toward said grab handle stored position.

4. The apparatus as set forth in claim 1 further including a damper for damping pivotal movement of the grab handle relative to the vehicle portion.

5. The apparatus as set forth in claim 1 wherein said cap hinge supports said cap for pivotal movement between said cap stored position and said cap operative position when said grab handle is in said grab handle stored position.

6. An apparatus for connection with a vehicle portion adjacent a vehicle occupant compartment, said apparatus comprising:

a grab handle including spaced first and second support arms;

a hinge assembly connectable with said first and second support arms to support said grab handle on the vehicle portion for pivotal movement relative to the vehicle portion about an axis between a grab handle stored position adjacent the vehicle portion and a grab handle operative position pivotally spaced apart from the vehicle portion; and a cap connected with said hinge assembly for pivotal movement about said axis, said cap including a central cap portion and first and second side portions extending transverse to said cap portion from opposite lateral edges of said cap portion;

said cap portion extending between said support arms and blocking visibility of at least a portion of said hinge assembly from the vehicle occupant compartment when said grab handle is in said grab handle stored position, said first side portion overlying an outer surface of said first support arm, said second side portion overlying an outer surface of said second support arm;

said grab handle having a portion that engages said cap when said grab handle is moved from said grab handle stored position to said grab handle operative position, said portion causing said cap to be pivoted about said axis along with said grab handle upon movement of said grab handle from said grab handle stored position to said grab handle operative position.

7. The apparatus as set forth in claim 6 further including a biasing member for biasing said grab handle toward said grab handle stored position.

8. The apparatus as set forth in claim 6 further including a damper for damping pivotal movement of the grab handle relative to the vehicle portion.

9. The apparatus as set forth in claim 6 wherein said hinge assembly supports said cap for pivotal movement between a cap stored position and a cap operative position when said grab handle is in said grab handle stored position.

10. The apparatus as set forth in claim 1 wherein said grab handle includes a support portion comprising spaced first and second support arms, said first and second support arms being operatively connected with said grab handle hinge to support said grab handle for pivotal movement relative to the vehicle, said first hook portion overlying said first support arm and said second hook portion overlying said second support arm when said cap is in said stored position.

11. The apparatus as set forth in claim 1 wherein said grab handle hinge supports said grab handle for pivotal movement and said cap hinge supports said cap for pivotal movement about the same axis.

12. An apparatus for connection with a vehicle portion adjacent a vehicle occupant compartment, said apparatus comprising:

a grab handle including a grasping portion and first and second connection portions positioned at opposite ends of said grasping portion, said first connection portion comprising a pair of spaced support arms extending parallel to each other;

a cap including a central cap portion and first and second side portions extending transverse to said cap portion from opposite lateral edges of said cap portion, said first and second side portions each including a hook portion, said first side portion overlying an outer surface of said first support arm, said second side portion overlying an outer surface of said second support arm, and said cap portion extending between said first and second support arms; and a hinge assembly for supporting said grab handle and said cap on the vehicle portion for pivotal movement relative to the vehicle portion and relative to each other about a common axis, said cap being pivotal about said axis between a cap stored position and a cap operative position, said cap portion blocking visibility of at least a portion of said hinge assembly from the vehicle occupant compartment when said cap in said cap stored position, said hook portions being positioned for supporting an object in the vehicle when said cap is in said cap operative position.

13. The apparatus as set forth in claim 12 wherein said grab handle is pivotal about said axis between a grab handle stored position and a grab handle operative position, said support portions engaging said cap portion when said grab handle is moved from said grab handle stored position to said grab handle operative position, said portion causing said cap to be pivoted about said axis along with said grab handle upon movement of said grab handle from said grab handle stored position to said grab handle operative position.

* * * * *